June 8, 1965 P. K. TURNER 3,188,596
WIRING DEVICE WITH SIMPLIFIED GROUNDING AND MOUNTING MEANS
Filed July 2, 1962 2 Sheets-Sheet 1
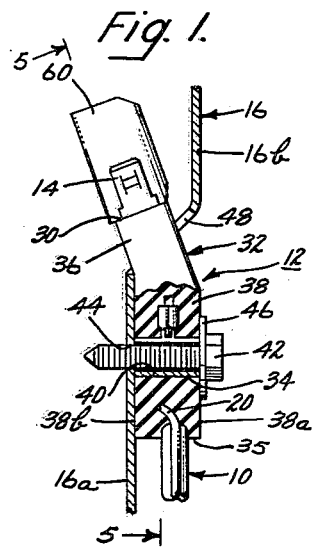
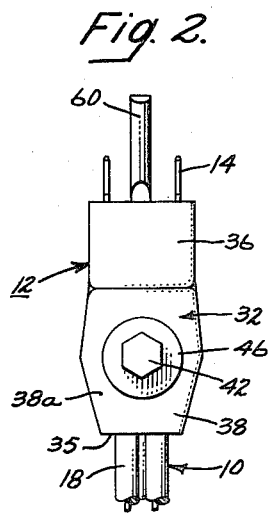
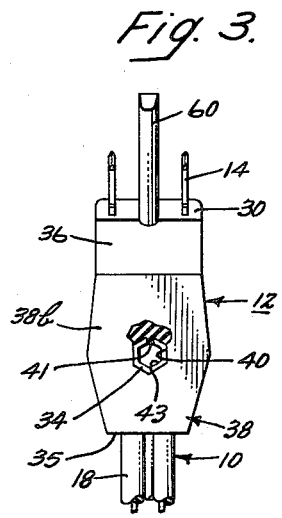
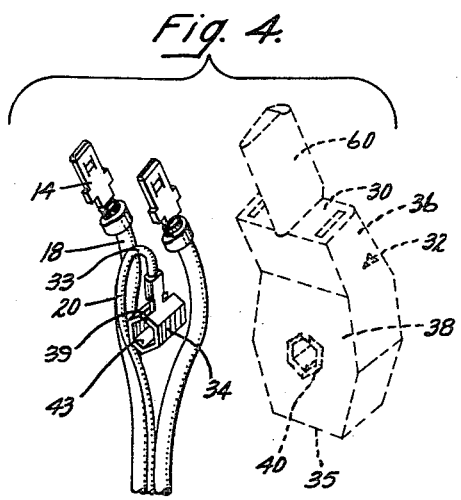
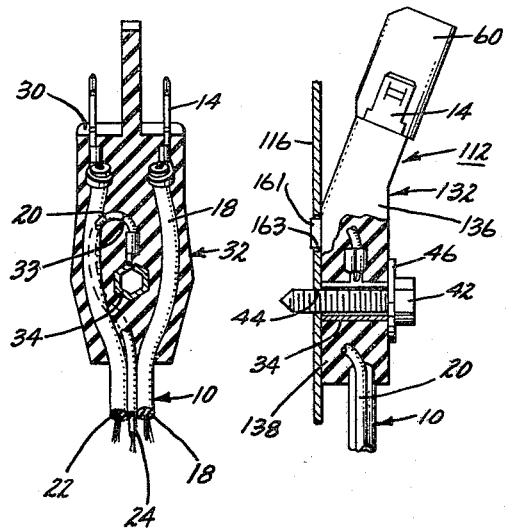
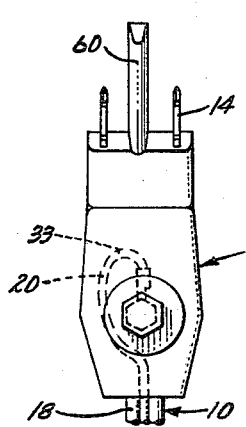
Inventor:
Prescott K. Turner
by Thomas A. Briody
His Attorney June 8, 1965   P. K. TURNER   3,188,596
WIRING DEVICE WITH SIMPLIFIED GROUNDING AND MOUNTING MEANS
Filed July 2, 1962   2 Sheets-Sheet 2
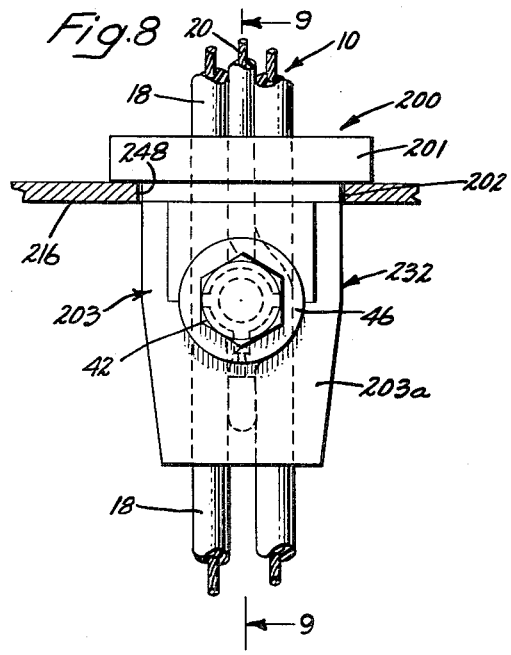
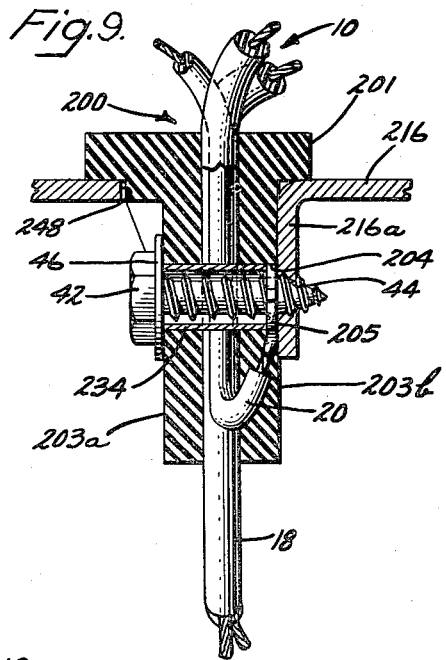
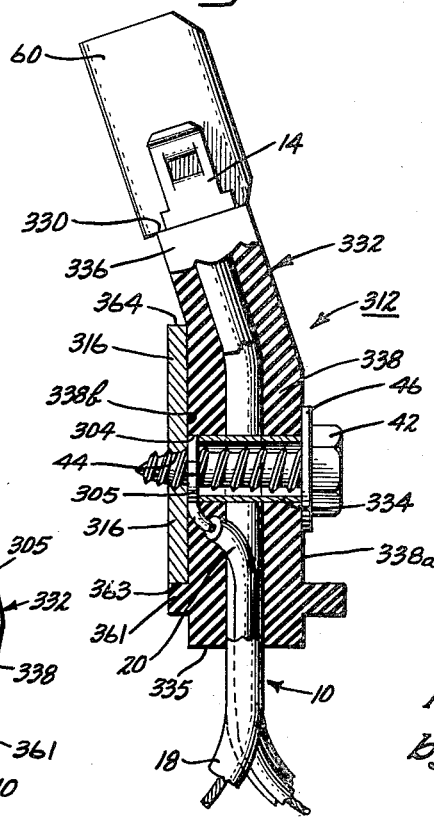
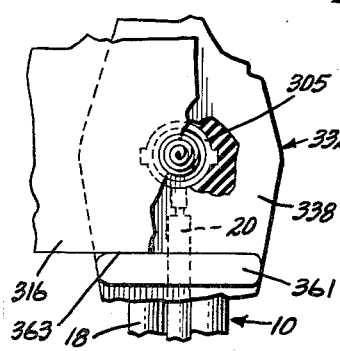
Inventor:
Prescott K. Turner,
by Thomas A. Briody
His Attorney.

United States Patent Office 3,188,596
Patented June 8, 1965

3,188,596
WIRING DEVICE WITH SIMPLIFIED GROUNDING AND MOUNTING MEANS
Prescott K. Turner, Fairfield, Conn., assignor to General Electric Company, a corporation of New York
Filed July 2, 1962, Ser. No. 206,931
6 Claims. (Cl. 339—14)

The present invention relates to electrical wiring devices employing a grounding contact and more particularly to strain relieving wiring devices for electrical cords, which may be readily mounted in a supporting panel and grounded thereto.

Wiring devices employing grounding conductors have seen wide-spread use in cordsets for various appliance applications, such as for example, in electric washing machines, air conditioners and dishwashers. Prior art devices of this variety have generally been found to require separate and distinct operations for mounting the device to a supporting panel for strain relieving the cord and also connecting the grounding contact. An important object of the present invention is to provide an improved wiring device for an electric cord wherein the grounding contact is arranged in such a manner that a single operation may be utilized to both mount the wiring device for strain relieving purposes and connect the grounding conductor to the panel.

An additional object of this invention is to provide an improved wiring device for a cord wherein the grounding contact means is arranged in such a manner that it reduces the cost of manufacturing the device and prohibits the possibility of short circuiting.

A further object of my invention is to provide an improved wiring device which may be readily mounted in a supporting panel to provide a strain relief and a terminal block for ends of associated conductors.

In carrying out my invention, in one form thereof, I have provided an improved wiring device which is attached to one end of a three-conductor rip cord. The conductors of this cord are of substantially the same length and they enter a molded insulating body from one end wall thereof. A pair of spaced apart contact prongs are connected to the bared ends of associated conductors of the cord within the insulating body and extend outwardly from another end wall of the body. In this arrangement, an annular grounding contact is disposed within the insulating body and connected to the bared end of another conductor of the cord. This grounding contact communicates with a pair of opposed faces of the insulating body and receives a screw therethrough. The screw is extended through the grounding contact and threaded into engagement with a supporting panel to concurrently mount the wiring device and connect the grounding contact. Thus, by positioning the annular grounding contact within the insulating body and using a single screw, the device is positively secured to the panel and the grounding conductor is also readily connected to the panel by means of a single operation.

Further aspects of my invention will become apparent hereinafter, and the specification concludes with claims particularly pointing out and distinctly claming the subject matter which I regard as my invention. The invention, however, as to organization and method of utilization, together with further objects and advantages thereof, may best be understood by reference to the following description, when taken in conjunction with the accompanying drawing, in which:

FIG. 1 is a side elevation view partially in full and partially in section, of an improved wiring device embodying one form of the present invention, the device being mounted in a suitable supporting panel;

FIG. 2 is a front view of the improved wiring device of FIG. 1;

FIG. 3 is a rear view, partially in section, of the improved wiring device of FIG. 1;

FIG. 4 is a partially exploded view of the wiring device of FIG. 1, showing the contacts fastened to the bared ends of the cord conductors, and the relative positions which the conductors and contacts assume in the mold before the insulating body (which is shown by dotted lines) is formed around the contacts and their associated cord connections;

FIG. 5 is a sectional view taken generally along the lines 5—5 of FIG. 1;

FIG. 6 is a side elevation view partially in full and partially in section, of an improved wiring device embodying my invention in a second form thereof;

FIG. 7 is a front view of the device of FIG. 6;

FIG. 8 is a side elevation view of a strain relieving device embodying a third form of my invention;

FIG. 9 is a sectional view taken generally along the line 9—9 of FIG. 8;

FIG. 10 is a side elevation view partially in full and partially in section, of a panel mounted wiring device which embodies a fourth form of my invention; and FIG. 11 is a fragmentary front view of the wiring device of FIG. 10.

Referring first to FIGS. 1–5 of the drawings, there is illustrated an electric power cord 10 and a wiring device or cord connector 12 having a pair of contact prongs or blades 14 for making engagement with the female contacts of a suitable appliance (not shown). The wiring device 12 and the illustrated portion of power cord 10 are located at one end of a cordset, the other end thereof including a plug for engagement with a suitable power outlet. The device 12 is securely positioned on the panel 16 of an appliance and furnishes power to the appliance for operation thereof through power cord 10.

Considering now, more particularly, the structure of wiring device 12 and cord 10, attention is initially directed to FIGS. 4 and 5. Cord 10 is a relatively flat or oval-shaped three-conductor rip cord, and includes two outermost insulated circuit conductors 18 with a centrally disposed grounding conductor 20 therebetween. The conductors 18 and 20 are normally disposed in parallel relationship to each other. Each of the conductors 18 and 20 includes a number of stranded wires (as shown in FIG. 5) which are insulated by the extrusion of a suitable thermoplastic insulating jacket 22 thereof, such as polyvinyl chloride. A very thin coating 24 of thermoplastic material covers conductor 20 within jacket 22. Coating 24 serves to identify and insulate the grounding conductor 20 after its separation from the two outermost circuit conductors 18.

Turning now to a significant aspect of the present invention, which concerns a novel and improved grounding contact arrangement for the wiring device 12, attention is directed to FIGS. 4 and 5. As shown in FIG. 5, a pair of contact blades 14 extend outwardly from upper end 30 of an angularly-shaped connector insulating body 32. The insulated conductors 18 are connected to the inner ends of the contact blades 14 within the insulating body 32. With such an arrangement, in the illustrated device 12, the free end of the grounding conductor 20 is looped over at 33, as shown in FIGS. 4 and 5, and has a hexagonally-shaped contact sleeve 34 crimped thereto. The contact sleeve 34 is positioned in integral relationship with insulating body 32 so that it may be simply and efficiently connected to panel 16, as shall become apparent hereinafter.

More particularly, as shown in FIGS. 1 and 4, the insulating body 32 has an angularly-shaped profile, and from upper end 30 to lower end 35, it includes section 36, through which the contact prongs 14 extend outwardly, and section 38, in which the grounding contact 34 is located. As shown in FIGS. 1 and 3, the sleeve 34 is integrally molded into an aperture 40 in section 38, with the outer ends of the sleeve 34 facing outwardly from the opposed front and rear faces 38a and 38b of section 38. In the illustrated device, the sleeve 34 has a split 39 formed therein (FIG. 4) which receives a molded rib 41 of the insulating body. Due to the hexagonal configuration of the contact sleeve 34 and the cooperation of split 39 of the sleeve 34 with rib 41 of the insulating body 32, the sleeve 34 is securely interlocked into positive engagement with the insulating body.

For effectively securing the wiring device 12 to panel 16 while at the same time also connecting the contact sleeve 34 to the panel, a screw 42 (FIG. 1) is extended through the aperture 43 (FIG. 3) of the sleeve 34 from the right side thereof (as shown in FIG. 1). The head of screw 42 engages the front face 38a of section 38 of the insulating body 32 (FIG. 1) and the threaded other end of the screw 42 rotates into engagement with the tapped opening 44 of the panel 16 to fasten the connector 12 securely to the panel 16. When the screw 42 is tightened into threaded engagement with panel 16, the end of grounding contact 34 which abuts face 38b of the insulating body is compressed into electrical engagement with panel 16 thereby grounding the conductor 20. It will thus be seen that by the single simple operation of fastening screw 42 into threaded engagement with panel 16, the wiring device is grounded to the panel and at the same time it is securely fastened thereto.

In the illustrated device 12, a washer 46 is placed on screw 42 between its hexagonal head and face 38a of the body 32. When device 12 is mounted on panel 16, washer 46 is compressed into engagement with the end of grounding contact 34 which abuts face 38a of the insulating body.

To prevent rotation of the wiring device 12 with respect to the panel 16, as shown in FIG. 1, the contact blade section 36 of the body 32 is extended through an aperture 48. In the illustrated arrangement of FIG. 1, aperture 48 is formed in a transverse wall disposed in angular relationship to spaced apart parallel walls 16a and 16b of the panel 16.

For economically manufacturing the wiring device 12 with the electric cord 10, the conductors 18 and 20 are all preferably cut to substantially the same length. (See FIG. 5.) By using conductors 18 and 20 of the same length for device 12, the burdensome cost of scrap which has been inherent in numerous prior art wiring devices is thereby obviated.

To preclude the possibility of short circuiting between the outermost ends of contact prongs 14, and between the female contacts (not shown) connected thereto, an elongated tongue-like insulating barrier 60 extends outwardly from end 30 of body 32. Barrier 60 is disposed between and generally parallel to the spaced contact prongs 14.

FIGS. 6 and 7 represent a second form of the present invention wherein wiring device 112 has been employed. For device 112, the same reference numerals have been employed to indicate connector parts and associated conductors which have heretofore been described for device 12. Parts of device 112 which have a modified structure in comparison to the structure of their correlative parts for device 12, but perform the same basic functions are identified by the same reference numerals, with the numeral 1 prefixed thereto.

The basic difference between wiring device 112 and device 12 resides in the fact that device 112 is generally positioned on one side of the panel 116 with its contact prongs 14 facing angularly outwardly and to the right of the panel (viewing FIG. 6), whereas the device 12 is constructed so that its contact prongs 14 face angularly inwardly and to the left of the panel 16 (viewing FIG. 1) and extend through the panel 16. The insulating body 132 of device 112 thus includes section 136 through which the contact prongs 14 extend angularly outwardly toward the front (FIG. 6), and section 138 which is disposed in angular relationship to section 136 on the same side of panel 116 as section 136. The grounding conductor 20 for device 112 is looped over at 33 (FIG. 7) so that its free end extends in a direction reverse to that of the bared ends (not shown) of the conductors 18. The free end of conductor 20 is also fastened to the hexagonally configured grounding contact sleeve 34 in the same manner as previously described for device 12. Device 112 is fastened to the panel 116 by the extension of screw 42 through sleeve 34 of the insulating body 132, and the rotation of the outer end of screw 42 into threaded engagement with tapped hole 44 of panel 116, in the same manner as previously described for device 12. In addition, as shown in FIG. 6, attachment of wiring device 112 to panel 116 also connects the grounding contact 34 to the panel, in the same manner as set forth for wiring device 12.

To prevent rotation of wiring device 112 in panel 116, a rectangular boss 161 is formed on the side of section 138 of the insulating body 132 which faces the panel 116. Boss 161 enters a suitable rectangular aperture 163 (as shown in FIG. 6) formed in the panel 116 and cooperates therewith to preclude any rotation of device 112 with respect to the panel after it is fastened thereto by means of screw 42.

FIGS. 8 and 9 illustrate a third form of the present invention wiring device 200 is employed as a strain relief for a three-conductor ripcord 10 in panel 216. For device 200, the same reference numerals have been employed to indicate device parts and associated conductors which have heretofore been described for device 12. Parts of device 200 which have a modified structure in comparison to the structure of their correlative parts for device 12, but perform the same basic functions are identified by the same reference numerals, with the numeral 2 prefixed thereto.

The basic difference between wiring device 200 and device 12 is that device 200 does not include terminals for the outermost conductors 18 of the cord 10, whereas device 12 does. Thus, as shown in FIG. 8, device 200 serves essentially as a strain relief for cord 10, while, as shown in FIG. 1, device 12 serves as both a strain relief and terminal block for cord 10.

The insulating body 232 of device 200 includes a flanged end portion 201, a perimetrical recess 202 for snugly receiving a thin supporting panel 216 (as shown in FIG. 8), and a body section 203 suitably adapted for entry into slot 248 of panel 216 from one side thereof. The body section 203 of device 200 includes front face 203a and rear face 203b. With this particular arrangement, contact sleeve 234 is molded into integral relationship with section 203 of the insulating body, with the outer ends of the sleeve 234 facing outwardly from the opposed front and rear faces 203a and 203b. However, as shown in FIG. 9, the outer end of sleeve 234 which is adjacent to rear face 203b is recessed therefrom at 204. The purpose of this arrangement of sleeve 234 in the insulating body shall become apparent hereinafter. As shown in FIG. 8, the three-conductor cord 10 enters into the insulating body 232 from the upper end thereof. The insulated conductors 18 thereupon extend downwardly and outwardly from the lower end of body 232 (viewing FIG. 8) and are suitably connected to appropriate terminals. The grounding conductor 20 is crimped into engagement with a flat ring-shaped contact 205 and looped over, as shown in FIG. 9, so that the axis of the ring-shaped contact 205 is aligned with sleeve 234 and contact 205 is located in recess 204.

When the strain relieving wiring device 200 is disposed in the slot 248 of panel 216, the rear face 203b of insulating body 232 abuts a depending flange 216a of panel 216 (see FIG. 9). For effectively securing the device 200 to panel 216 while at the same time also connecting the contact 205 to the panel, a screw 42 is extended through the aperture of the sleeve 234 from the left side thereof (as shown in FIG. 9) as well as being extended through contact 205. The head of screw 42 engages the front face 203a of section 203 of the insulating body 232 and the threaded other end of the screw is rotated into engagement with tapped opening 44 of the panel 216 to fasten the device 200 securely to the panel. When the screw 42 is tightened into threaded engagement with panel 216, the ring-shaped contact 205, which is molded into recess 204 of the insulating body, is sandwiched and compressed between the adjacent end of sleeve 234 and flange 216a. The ring-shaped contact 205 is thus compressed into electrical engagement with panel 216, thereby grounding the conductor 20. It will thus be seen that by means of the single simple operation of fastening screw 42 into threaded engagement with panel 216, device 200 is grounded to the panel and at the same time is is securely fastened thereto.

FIGS. 10 and 11 show a fourth form of the present invention, wherein wiring device 312 is employed similarly to device 12 of previous description. For device 312, the same reference numerals have been employed to indicate connector parts and associated conductors which have been described hereinbefore for device 12. Parts of device 312 which have a modified structure in comparison to the structure of their correlative parts for device 12, but perform the same basic functions are identified by the same reference numerals, with the numeral 3 prefixed thereto.

The basic difference between wiring device 312 and device 12 is found in the fact that device 312 includes a two part built-in grounding contact, while the device 12 has a one piece grounding contact. More particularly, as shown in FIG. 10, the insulating body 332 of device 312 generally resembles body 32 of device 12. Thus, body 332 has an angularly-shaped profile, and from upper end 330 to lower end 335, it includes section 336, through which the contact prongs 14 extend outwardly, and section 338, in which a grounding contact sleeve 334 is located. Contact sleeve 334 is molded into integral relationship with section 338 of the insulating body, with the outer ends of the sleeve 334 facing outwardly from the opposed front and rear faces 338a and 338b. However, as shown in FIG. 10, the outer end of sleeve 334 which abuts rear face 338b is recessed therefrom at 304. As best seen in FIG. 10, the outermost conductors 18 of cord 10 extend through insulating body 332 in the same manner as previously set forth for wiring device 12. A flat ring-shaped contact 305 is crimped to the free end of the grounding conductor 20. Contact 305, which is constructed similarly to contact 205 of device 200, is located in flush fashion within recess 304, its axis being in alignment with sleeve 334.

The wiring device 312 is positioned in a panel 316, as suggested by FIG. 10, with transverse rib 361 engaging edge 363 of the panel and section 336 of the insulating body extending upwardly and to the left of edge 364 of the panel.

Wiring device 312 is secured to panel 316 in the same manner as previously set forth for device 200, a screw 42 being extended through the aperture of the sleeve 334 and through the ring-shaped contact 305, and threaded into engagement with tapped opening 44 of the panel 316. It will thus be seen that by means of a single operation of fastening screw 42 into threaded engagement with panel 316, device 312 is grounded to the panel and at the same time it is securely fastened thereto.

It will now, therefore, be seen that my new and improved wiring devices as illustrated herein provide for the novel arrangement of a grounding contact means in integral association with a molded insulating body, enabling the wiring device to be readily mounted in a supporting panel and grounded thereto by a single operation. It will be understood further that wiring devices embodying the present invention are of compact construction and low in cost.

While in accordance with the patent statutes, I have described what at present are considered to be the preferred embodiments of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. A wiring device for securing an electric cord to a panel, said device comprising an insulating body, said cord including at least three conductors at least one of which terminates within said insulating body, a grounding contact disposed in said body and connected therein to an end of said one conductor, said insulating body having an aperture extending therethrough between two of said conductors, said grounding contact being integrally associated with the walls of said aperture, at least one end of said grounding contact being essentially flush with one face of said insulating body, and means including said aperture and said grounding contact for fastening said device to a panel thereby to secure said device to the panel and directly engage said grounding contact thereto.

2. The wiring device of claim 1 wherein said device includes at least two spaced apart contacts exposed at one end of said insulating body, said contacts being connected to associated conductors of said cord within said body.

3. The wiring device of claim 2 wherein said device includes a projection formed on one of a pair of opposed faces thereof for cooperation with an aperture of the panel thereby to position said device thereon.

4. A wiring device having a strain relief for securing an electric cord to a panel, said device comprising a molded insulating body, said cord including at least three conductors at least one of which terminates within said insulating body, annular grounding contact means disposed medially of said body between two of said conductors and connected therein to the end of said one conductor, said molded body encapsulating said conductor and said grounding means at their connection, said grounding means being formed of electrically conductive metal less compressible than said molded insulating body and the ends of said contact being essentially flush with a pair of opposed faces in said insulating body, and a screw extending through said grounding means and fastened to said panel thereby to secure said device to said panel and connect said grounding means thereto, said grounding means engaging said panel to assure a good grounding connection therewith and preventing the compression of said insulating body by said screw.

5. The wiring device of claim 4 wherein said device includes at least two spaced apart contacts exposed at one end of said insulating body, said contacts being connected to associated conductors of said cord within said body.

6. A wiring device for securing an electric cord to a panel and providing a strain relief for said cord, said device comprising an insulating body, said cord including at least three conductors at least one of which terminates within said insulating body, an annular sleeve disposed in integral association with said body, an annular grounding contact connected to said conductor in said body and in axial alignment with said sleeve and in engagement with said sleeve, said grounding contact being essentially flush with one face of said body, and a screw extending through said sleeve and said grounding contact and fastened to said panel thereby to secure said device to said panel thereby to secure said device to said panel and engage said grounding contact therewith.

References Cited by the Examiner
UNITED STATES PATENTS

| | | |
|---|---|---|
| 1,157,026 | 10/15 | Meschenmoser. |
| 2,484,558 | 10/49 | Eisner _____ 339—14 |
| 2,723,380 | 11/55 | Howard _____ 339—10 |
| 2,742,624 | 4/56 | Stevens _____ 339—14 X |
| 2,792,557 | 5/57 | Dowick _____ 339—14 |

FOREIGN PATENTS 475,030  7/51  Canada.

JOSEPH D. SEERS, *Primary Examiner.*